United States Patent [19]

Iwatsuki et al.

[11] Patent Number: 4,969,099

[45] Date of Patent: Nov. 6, 1990

[54] DOUBLE-DETECTING, TROUBLE-JUDGING AND FAILSAFE DEVICES IN SYSTEM FOR INTEGRALLY CONTROLLING AUTOMATIC TRANSMISSION AND ENGINE

[75] Inventors: Kunihiro Iwatsuki; Yoshio Shindo; Hiroji Taniguchi; Yuji Kashihara; Fumiaki Izumi, all of Toyota, Japan

[73] Assignee: Toyota Jidosha Kabushiki Kaisha, Japan

[21] Appl. No.: 24,696

[22] Filed: Mar. 11, 1987

[30] Foreign Application Priority Data

| Mar. 11, 1986 | [JP] | Japan | 61-052800 |
| Jul. 18, 1986 | [JP] | Japan | 61-169592 |
| Jul. 22, 1986 | [JP] | Japan | 61-172279 |
| Aug. 1, 1986 | [JP] | Japan | 61-181779 |
| Aug. 8, 1986 | [JP] | Japan | 61-186492 |

[51] Int. Cl.$^5$ .................. G06F 11/28; G05D 27/02
[52] U.S. Cl. ............... 364/424.03; 364/424.1; 364/431.01; 74/866; 371/68.1
[58] Field of Search .......... 364/424.1, 431.01, 431.05, 364/131, 133, 424.03, 424.04, 431.03; 371/68, 68.1, 68.3; 74/866; 340/52 F, 505, 518

[56] References Cited

U.S. PATENT DOCUMENTS

| 4,208,929 | 6/1980 | Heino et al. | 79/866 X |
| 4,266,447 | 5/1981 | Heess et al. | 74/858 |
| 4,370,930 | 2/1983 | Stroh et al. | 74/858 |
| 4,403,527 | 9/1983 | Mohl et al. | 74/851 |
| 4,543,934 | 10/1985 | Morita et al. | 123/435 |
| 4,556,955 | 12/1985 | Wright et al. | 364/133 |
| 4,642,771 | 2/1987 | Asagi et al. | 364/424.1 |
| 4,667,176 | 5/1987 | Matsuda | 340/52 F |
| 4,698,764 | 10/1987 | Inagaki et al. | 364/424.1 |
| 4,703,428 | 10/1987 | Hosaka et al. | 364/431.01 X |
| 4,732,246 | 3/1988 | Tateno et al. | 74/866 X |
| 4,740,898 | 4/1988 | McKee et al. | 364/431.01 X |
| 4,800,781 | 1/1989 | Yasue et al. | 74/860 |
| 4,807,497 | 2/1989 | Yasue et al. | 74/866 X |
| 4,811,223 | 3/1989 | Iwatsuki et al. | 74/866 X |
| 4,819,187 | 4/1989 | Yasue et al. | 364/424.1 |
| 4,825,372 | 4/1989 | Yasue et al. | 364/424.1 X |

FOREIGN PATENT DOCUMENTS

| 0227001 | 12/1984 | European Pat. Off. . |
| 0130811 | 1/1985 | European Pat. Off. . |
| 55-669738 | 5/1980 | Japan . |
| 247768 | 12/1985 | Japan | 364/424.04 |
| 2042658 | 9/1980 | United Kingdom . |
| 2156017 | 10/1985 | United Kingdom . |

Primary Examiner—Eugene R. Laroche
Assistant Examiner—Benny T. Lee
Attorney, Agent, or Firm—Oliff & Berridge

[57] ABSTRACT

In a system for integrally controlling an automatic transmission and an engine comprising: a member for controlling the engine; a member formed separately of the engine control member, for controlling the automatic transmission; and various communication lines for connecting the engine control member and the automatic transmission control member to each other; judgments are made quickly and without fail as to whether trouble exists, such as disconnections or short-circuits of the various communication lines. When a trouble is detected, the proper control is maintained as much as possible in accordance with the types of trouble.

27 Claims, 18 Drawing Sheets

| LAG ANGLE VALUE °CA LINE | 0 | 8 | 13 | 16 | 18 | 20 | 22 | 24 |
|---|---|---|---|---|---|---|---|---|
| 41 | X | X | X | O | O | X | O | O |
| 42 | X | X | O | X | X | O | O | O |
| 43 | X | O | X | X | O | O | X | O |

O: Energized
X: Deenergized

FIG. 7

| S1 | S2 | P | NORMAL OR FAIL | CONTENT |
|---|---|---|---|---|
| 1 | 0 | 1 | ○ | 1st |
| 1 | 0 | 0 | × | (S2 DISCONNECTION, 2nd) OR (P DISCONNECTION, 1st) |
| 1 | 1 | 0 | ○ | 2nd |
| 1 | 1 | 1 | × | THIS CASE IS IMPOSSIBLE |
| 0 | 1 | 1 | ○ | 3rd |
| 0 | 1 | 0 | × | (S1 DISCONNECTION, 2nd) OR (P DISCONNECTION, 3rd) |
| 0 | 0 | 0 | ○ | 4th |
| 0 | 0 | 1 | × | S1 OR S2, OR S1, S2 DISCONNECTION, 1st OR 2nd OR 3rd |

FIG. 9

| As | L1 | L2 | L3 | P | CONTENT OF CHECK |
|---|---|---|---|---|---|
| AS0 | 0 | 0 | 0 | 0 | IF P IS 1, L3 IS DISCONNECTED AT AS1. |
| AS1 | 0 | 0 | 1 | 1 | IF P IS 0, L2 IS DISCONNECTED AT AS3. |
| AS2 | 0 | 1 | 0 | 1 | IF P IS 0, L3 IS DISCONNECTED AT AS3. |
| AS3 | 0 | 1 | 1 | 0 | IF P IS 1, L1 IS DISCONNECTED AT AS7. |
| AS4 | 1 | 0 | 0 | 1 | IF P IS 0, L3 OR L2 IS DISCONNECTED AT AS5 OR AS6. |
| AS5 | 1 | 0 | 1 | 0 | IF P IS 1, L2 IS DISCONNECTED AT AS7. |
| AS6 | 1 | 1 | 0 | 0 | IF P IS 1, L3 IS DISCONNECTED AT AS7. |
| AS7 | 1 | 1 | 1 | 1 | IF P IS 0, THIS CASE IS IMPOSSIBLE. |

(FOR NORMAL TIME)

(FOR FAILSAFE TIME)

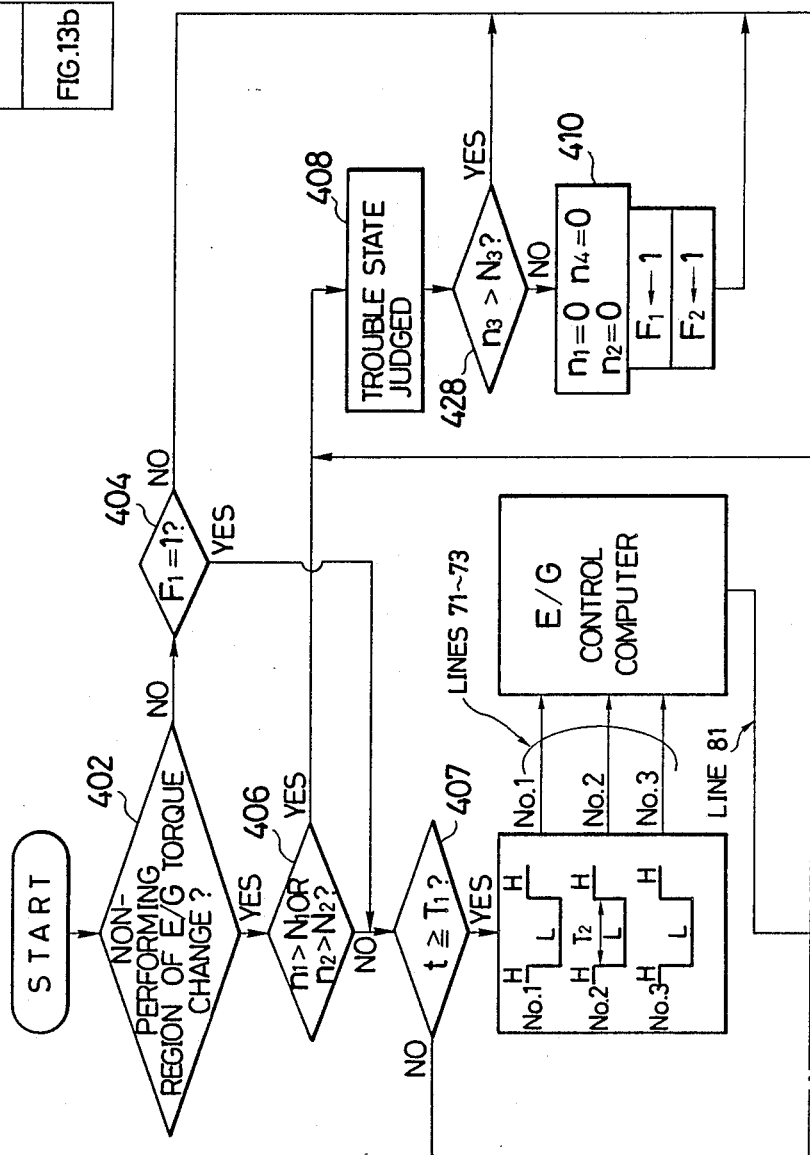

| PULSE NO. LINE | 1 | 2 | 3 | 4 | 5 | 6 | 7 | 8 |
|---|---|---|---|---|---|---|---|---|
| 71 | O | O | O | X | O | X | X | X |
| 72 | O | O | X | O | X | O | X | X |
| 73 | O | X | O | O | X | X | O | X |

O: NORMAL

X: DISCONNECTION OR SHORT-CIRCUIT

FIG.19

| LINE \ LAG ANGLE VALUE °CA | 0 | 8 | 13 | 16 | 18 | 20 | 22 | 24 |
|---|---|---|---|---|---|---|---|---|
| 71 | X | X | X | O | O | X | O | O |
| 72 | X | X | O | X | X | O | O | O |
| 73 | X | O | X | X | O | O | X | O |

O: ENERGIZED
X: DEENERGIZED

FIG.20

| LINE \ LAG ANGLE VALUE | 0 | 8 | 16 | 14 |
|---|---|---|---|---|
| 71 | X | X | O | O |
| 72 | X | O | X | O |

O: ENERGIZED
X: DEENERGIZED

FIG.21

| LINE \ LAG ANGLE VALUE | 0 | 24 |
|---|---|---|
| 71 | X | O |

O: ENERGIZED
X: DEENERGIZED

DOUBLE-DETECTING, TROUBLE-JUDGING AND FAILSAFE DEVICES IN SYSTEM FOR INTEGRALLY CONTROLLING AUTOMATIC TRANSMISSION AND ENGINE

BACKGROUND OF THE INVENTION

This invention relates to trouble-detecting, trouble-judging and failsafe devices in a system for integrally controlling an automatic transmission and an engine.

Automatic transmissions comprising gear transmission mechanisms, a plurality of frictionally engaging devices, and hydraulic pressure control devices operated to selectively switch the engagements of the frictionally engaging devices, so that any one of a plurality of gear stages can be achieved in accordance with a preset shift map, are well known in the transmission art.

Furthermore, in an automatic transmission for a vehicle, of the type described, various systems are known for integrally controlling an automatic transmission and an engine, wherein, engine torque is changed during shifting to obtain satisfactory shift characteristics and durability of the frictionally engaging devices.

When the engine torque is changed during shifting, absorbed energy in members and in the frictionally engaging devices for braking these members in the automatic transmission can be controlled. As a result, the shifting can be completed with low shocks for a short period of time, so that a satisfactory shift feeling can be given to a driver and the durbility of the frictionally engaging devices can be improved.

Now, in constructing the above-described system, when means for controlling the engine, means for controlling the automatic transmission and further control means for changing the engine torque by a predetermined value as commensurate to the shifting of the automatic transmission are integrally provided, such problems are presented that increased capacity of a computer leads to increased cost and it is disadvantageous to mount the system on a vehicle which has a high limitation in storage space.

Furthermore, adoption of the integrally controlling system may be disadvantageous from the viewpoints of commonuse properties and general-purpose properties, because there are vehicles which require no engine change.

To obviate the above-described disadvantages, there is proposed a technique wherein the aforesaid control means are separately provided (for example, Japanese Patent Application No. 105543/1986: this is not of the prior art).

However, when the means for controlling the engine and the means for controlling the automatic transmission are formed separately of each other as described above, in order to change the engine torque during shifting for example, it becomes necessary to provide communication lines which connect both control means to each other. The provision of these communication lines presents such a problem that these communication lines may be disconnected or short-circuited. As a result, an engine torque change control cannot be adequately carried out in a case where the engine torque change control should be performed. If the aforesaid situation occurs, then an amount of absorbed energy in the frictionally engaging devices on the automatic transmission side increases, whereby the durability of these frictionally engaging devices is deteriorated. Furthermore, the shift duration is prolonged, whereby the shifting is not completed within a shockless region of an accumulator, so that shift shocks become high. This is because, on the automatic transmission side, shift turning data such as oil pressure are preset in expectation of decrease in the engine torque by a predetermined value during the shifting.

As a consequence, it is necessary to detect troubles in these communication lines as soon as possible and accurately. Further, the detected troubles should be appropriately coped with.

SUMMARY OF THE INVENTION

The present invention has been developed to obviate the above-described disadvantages and has its object the provision of satisfactory trouble-detecting, trouble-judging and failsafe devices in a system for integrally controlling an automatic transmission and an engine, said system comprising: means for controlling the engine; means for controlling the automatic transmission formed separately of the means for controlling the engine; and communication lines for connecting the engine control means and the automatic transmission means to each other.

According to the present invention, since the engine control means and the automatic transmission control means are formed separately of each other, the automatic transmission control means is required to control only the automatic transmission in principle regardless of the presence of the engine torque control during shifting etc., so that the usefulness is enhanced accordingly.

According to the first aspect of the present invention, in detecting malfunctions or troubles in the communication lines (such as short circuits or disconnections), time durations are predetermined in non-performing regions of the original control using the communication lines. As a result, within these predetermined time durations, there is no room at all in the communication lines for receiving signals to perform the original control. As a consequence, there is no possibility that signals outputted to detect troubles are mixed with signals outputted to perform the original control, so that trouble detections free from mistakes can be carried out. Additionally, these predetermined time durations may be different from one communication line to another.

Furthermore, an ON-OFF operation is repeated at least once during the predetermined time durations, so that both cases where a communication line is short-circuited and disconnected can be accurately detected.

A preferred embodiment of the first aspect of the present invention is of such an arrangement that, as the predetermined time durations within the non-performing region of the original control, a predetermined time duration from turn-ON of the engine ignition switch is selected. When the predetermined time duration from the turn-ON of the engine ignition switch is selected as the predetermined time duration within the non-performing region, the signal to carry out the original control and the signal outputted to detect a trouble do not interfere with each other. To be specific, this predetermined time duration can be obtained during cranking state of the engine, so that there is no possibility that a signal to carry out the original control, such as for example a signal to change the engine torque, comes in the communication line. Furthermore, troubles in the communication lines can be previously detected prior to driving the vehicle.

Another preferred embodiment of the first aspect of the present invention is of such an arrangement that, as the predetermined time durations within the non-performing region of control, a time duration during which a throttle opening is less than a predetermined value is selected. The reason for this selection resides in that the integral control of the engine and the automatic transmission (such as the engine torque change during shifting) is not carried out in general when the throttle opening is less than the predetermined value. When the throttle opening reaches the predetermined value during trouble detection, the trouble detection may be stopped for this time.

According to a second aspect of the present invention, redundancy check means for detecting troubles in the communication lines is provided. As a result, for example, whether information of torque change timing and a torque change value is normally transmitted or not can be constantly monitored. As a consequence, there is no need for determining "predetermined time durations for inspection" as in the first aspect of the present invention.

A preferred embodiment of the second aspect of the present invention is of such an arrangement that, when the transmitted content of the communication line is changed, whether the redundancy check means is in trouble or not is checked. With this arrangement, whether the redundancy check means itself is in trouble or not can be checked.

Another preferred embodiment of the second aspect of the present invention is of such an arrangement that it is checked whether one of the communication lines, from which the trouble is detected, is a shift output information line from the automatic transmission control means, and, whether the redundancy check means is in trouble when the shift output information is issued. The reason for this arrangement resides in that judgment of trouble in the redundancy check means can be carried out when the shift output information is issued as will be described hereunder.

Needless to say, it is an effective measure to adopt such an arrangement that so-called redundancy can be obtained in the system through the utilization of a redundant code. More specifically, this redundant code is excessively added to a constituent for executing an original function, so that, even when part of the constituent falls into a trouble, the function of the part in trouble can be made through the redundant code. With this arrangement, the system as a whole can maintain normal operation.

A preferred embodiment of the first and the second aspects of the present invention is of such an arrangement that, in detecting a trouble in a communication line, a voltage between battery terminals is detected, and, when the voltage is low, the trouble judgment is stopped. As a result, such a disadvantage can be avoided that, for example, a signal which should properly be at an ON level is judged at an OFF level because the voltage at the battery terminal is low, thus obviating the problem that the communication line which should be judged as normal is judged as in trouble, or on the contrary, the communication line which should be judged as in trouble is judged as normal.

Additionally, in this case, judgment as to whether the voltage among the battery terminals is low or not may be made by the fact that whether a predetermined time duration has elasped after a starter motor is turned ON or not. This method of judgement is based on the assumption that the voltage between the battery terminals is normally greater than the predetermined value. More specifically, the method is based on the fact that, immediately after the starter motor is turned ON, the voltage between the battery terminals temporarily becomes highly instable, however, after this period of time of instability elapses, the voltage between the battery terminals comes to be greater than the predetermined value. With this arrangement, trouble judgment can be easily avoided without providing a battery checker, etc. in particular. This method of judgment is particularly effective when the trouble judgment is made after the turn-ON of the ignition switch as described above as one of the preferred embodiments of the first aspect of the present invention.

According to a third aspect of the present invention, a state of trouble is judged when the means for detecting trouble senses trouble signals a plurality of times. As a result, the case where normal original control is stopped by an erroneous detection can be avoided, and the state of trouble can be reliably judged. More specifically, for example, from the viewpoint that erroneous control is not carried out at all, if a trouble is detected even once by the means for detecting the trouble, then this should be judged as the state of trouble. However, there is a possibility of that the trouble detection itself is erroneous. Furthermore, in the torque change control during shifting, etc., even if erroneous controls are carried out, a problem concerned with the safety of the vehicle running cannot be occured. According to the third aspect of the present invention, only when the trouble detections occur a plurality of times, a state of trouble is judged, whereby the state of trouble can be reliably judged, so that such a problem can be obviated, such that the engine torque control itself which would be normal is completely stopped thereafter by the erroneous detection and the like.

A preferred embodiment of the third aspect of the present invention is of such an arrangement that the means for judging whether the trouble detections have occurred a plurality of times or not is made to be means for judging whether the trouble detections have continuously occured a plurality of times or not.

Another preferred embodiment of the third aspect of the present invention is of such an arrangement that the means for judging whether trouble detections have occured a plurality of times or not is made to be means for judging whether the trouble detections have cumulatively occurred a plurality of times or not.

According to a fourth aspect of the present invention, when a state of trouble is judged on the basis of the result of detecting performed by the means for detecting a trouble, if the means for detecting the trouble subsequently detects non-troubles a plurality of times, then the normal state is judged again. More specifically, according to this fourth aspect, it is assumed that, even if the state of trouble is judged once, the trouble detecting is continued. As a result, when the non-troubles are detected a plurality of times, even if the state of trouble is judged once, the normal state is judged, so that the original engine torque change control etc. can be carried out again.

Additionally, according to this fourth aspect, in order to rejudge a state of "normal", it is essential to detect non-troubles a plurality of times. As a consequence, in order to judge "a state of trouble", it is not necessarily essential to detect troubles a plurality of times.

According to the fifth aspect of the present invention, in the case where the normal state is judged again by carrying out the fourth aspect and the like, if judgments of the trouble state and the normal state are repeated a plurality of times, and thereafter, a trouble state is judged, then the trouble state is judged finally. More specifically, according to this fifth aspect, the trouble detection is completely finished in this stage, and the trouble state is judged finally. With this arrangement, such a disadvantage can be avoided such that judgments of the normal state and the trouble state are repeated due to contact failure etc., with the result that engine torque change controls are carried out a multiplicity of times according to erroneous information. Additionally, in the fifth aspect, judgments of the trouble state and the normal state on the basis of the results of the respective trouble detections and not necessarily that the respective trouble detections and non-trouble detections occur a plurality of times.

In the third to the fifth aspects, the first and the second aspects can be applied to each of the trouble detections.

According to a sixth aspect of the present invention, which communication line is in trouble is detected respectively. Furthermore, a prearrangement used in the communications is changed in accordance with the state of trouble, and the communications are performed in accordance with the changed prearrangement by use of the remaining normal communication line, whereby the communication function can be maintained to the maximum. As a result, the original control can be performed to the maximum, thus minimizing the obstruction occurring due to the trouble in the communication line.

A preferred embodiment of the sixth aspect of the present invention is of such an arrangement that the results of trouble detections obtained respectively are transmitted by delivering pulse numbers prearranged in accordance with the types of troubles. With this arrangement, the counterpart control means can be aware of the type of trouble by counting the pulse number.

Additionally, in detecting as to which communication line is in trouble according to the sixth aspects, the aforesaid first to the fifth aspects can be applied.

Furthermore, when a trouble is detected or a trouble is judged according to the first to the sixth aspects, a warning may be outputted. With this arrangement, a driver can be quickly informed of the trouble.

BRIEF DESCRIPTION OF THE DRAWINGS

The above objects, features and advantages of the present invention, as well as other objects and advantages thereof, will become more apparent from the description of the invention which follows, taken in conjunction with the accompanying drawings, wherein like reference characters designate the same or similar parts and wherein:

FIG. 7 is a chart showing an example of a parity check carried out by the above control routine;

FIG. 9 is a chart showing the content of a parity check carried out by the above routine;

FIG. 13 illustrates the relationship between the flow charts of FIGS. 13A and 13B;

FIGS. 13A and 13B are flow charts showing a trouble detecting control routine carried out in the device of the above embodiment;

FIG. 19 is a chart showing the relationship (prearrangement) of the energization and deenergization of the communication lines with the lag angle values in the normal state;

FIG. 20 is a chart showing the relationship of the energization and deenergization of the communication lines with the lag angle values when one of the three communication lines is disconnected or short-circuited; and FIG. 21 is a chart showing the relationship of the energization and deenergization of the communication lines with the lag angle values when two of the three communication lines are disconnected or short-circuited.

DESCRIPTION OF THE PREFERRED EMBODIMENT

The present invention will be described in detail with reference to the accompanying drawings which illustrate preferred embodiments of the present invention.

As the integral controls of an automatic transmission and an engine, various types are thought of. However, here, an example of engine torque change control during shifting will be described.

Figure 1:
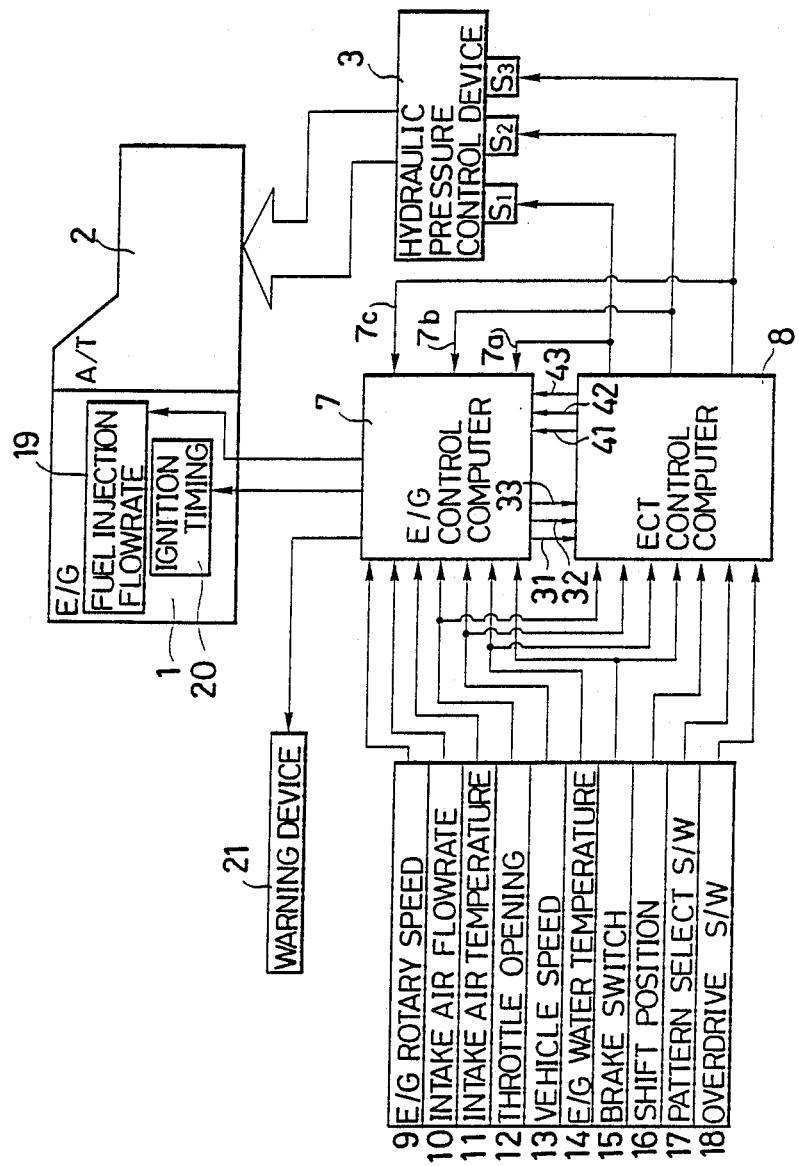
FIG. 1 is a general block diagram showing the trouble detecting device in the system for integrally controlling an engine and an automatic transmission, to which is applied a first embodiment of the present invention.

FIG. 1 is a block diagram showing the general arrangement of the system for integrally controlling an automatic transmission and an engine, to which the present invention is applied.

An engine 1 and an automatic transmission 2 are well known in the art. In the engine 1, fuel injection flowrate at an injector 19 and an ignition timing at a distributor 20 are controlled by an engine control computer 7 (EIG Control Computer), so that engine output in proportion to accelerator opening and engine rotary speed can be obtained. In the automatic transmission 2, electromagnetic valves S1-S3 are controlled by an automatic transmission control computer 8 (ECT Control Computer), and oil lines in a hydraulic pressure control device 3 are controlled whereby the engagements of frictionally engaging devices are selectively changed, so that a gear stage proportional to vehicle speed and accelerator opening can be obtained.

More specifically, the engine control computer 7 receives signals of engine rotary speed from an engine rotary speed sensor (crank angle sensor) 9; intake air flowrate from an air flow meter 10; intake air temperature from an intake air temperature sensor 11; throttle opening from a throttle sensor 12; vehicle speed from a output shaft speed sensor 13; engine water temperature from a water temperature sensor 14; and brake-ON signal from a brake switch 15. The engine control computer 7 determines the fuel injection flowrate and the ignition timing in response to the above-mentioned signals. The engine control computer 7 includes three branch signal lines 7a, 7b, 7c for receiving respective solenoid signals from the electromagnetic valves S1-S3 ON-OFF controlled by the automatic transimission control computer 8 and three signal lines 41-43 for delivering engine torque change value signals from the computer 8, whereby the shift timing of the automatic transmission is recognized and the lag time control during shifting is carried out.

On the other hand, the automatic transmission control computer 8 receives a signal of a shift lever position from a shift position sensor 16, a signal of a running selection pattern from a pattern select switch 17 such as the fuel consumption mode or the power performance mode, a signal of shift permission to an overdriving from an overdrive switch 18 and the like, in addition to signals from the vehicle speed sensor 13, the engine water temperature sensor 14, the brake switch 15 and the like. Furthermore, throttle opening signals are inputted into the automatic transmission computer 8 from the engine control computer 7 through communication lines 31-33. The automatic transmission control computer 8 can ON-OFF operate the electromagnetic valves S1-S2 so that a gear stage commensurate to the vehicle speed and the accelerator opening through these signals. Additionally, the electromagnetic valve S3 is used for engaging a lockup clutch.

Figure 2:
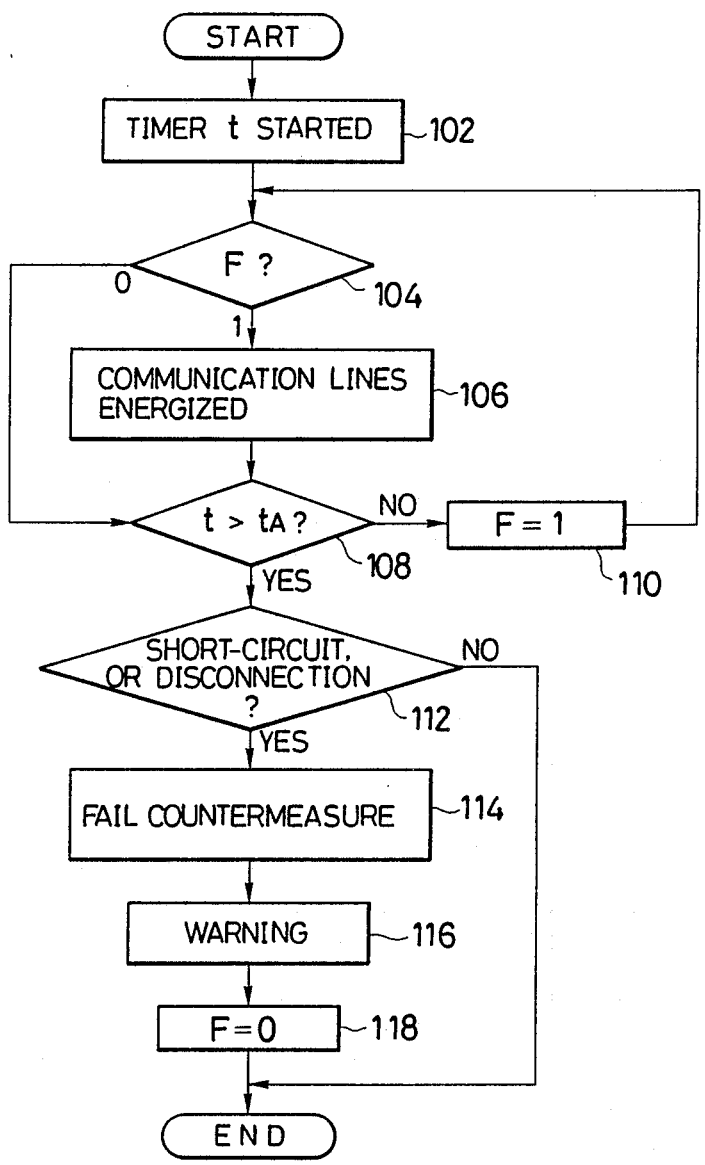
FIG. 2 is a flow chart showing a control flow in the above device.

FIG. 2 shows the control flow for detecting troubles in the device of the above embodiment.

Figures 3, 4:
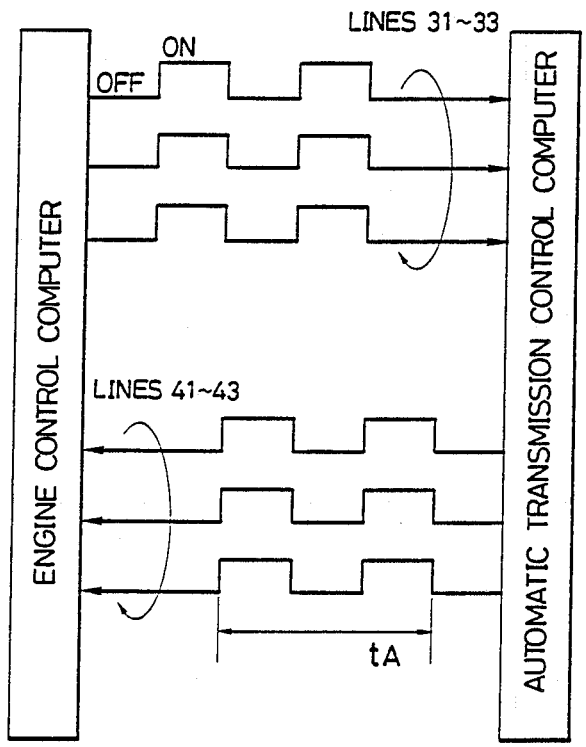
FIG. 3 is a chart showing examples of repeated signals for detecting a trouble.
FIG. 4 is a chart showing examples of the cases where ignition timing retard values are delivered by use of three communication lines.

When the ignition switch is turned ON, the respective control computers 7 and 8 are started. Simultaneously with the start of the both control computers 7 and 8, a timer t is started (Step 102). In Step 104, the value of flag F is inquired. This flag F is a flag for setting a predetermined time duration tA after the ignition switch is turned ON. Since flag F is initially set at 0, the routine preceeds to Step 108, where judgment is made as to whether the timer t has elapsed the predetermined time duration tA or not. When it is judged to be "NO", the routine proceeds to Step 110, where flag F is set to 1, and the routine returns to Step 104. As a result, in the subsequent flow, the routine proceeds from Step 104 to 106. In Step 106, preset signals shown in FIG. 3 for example are delivered from the engine control computer 7 to the automatic transmission control computer 8 through the throttle opening communication lines 31-33. Similarly, preset signals are delivered from the automatic transmission control computer 8 to the engine control computer 7 through the engine torque change value communiation lines 41-43. The signals thus delivered are continued until timer t is judged to elapse the predetermined time duration tA in Step 108. This predermined time duration tA is preferably set to a period of time during which the engine is in the cranking state. It is impossible that a shifting accompanying an engine torque change is requested during the predetermined time duration tA, so that the predetermined time duration tA can be regarded as a non-performing region of the torque change control. Needless to say, even if the signals shown in FIG. 3 are inputted into the both control computers 7 and 8 through the communication lines 31-33 and 41-43 during this predetermined time duration tA, each of these signals is not interpreted as a throttle opening signal or an engine torque change value signal.

After the predetermined time duration tA elapses, the routine proceeds to Step 112. In Step 112, in both control computers 7 and 8, during the predetermined time duration tA, when the signals delivered from each other are in the OFF state, it is judged to be the disconnection, when in the ON state, it is judged to be the short-circuit, and the routine proceeds to Step 114. Furthermore, if the ON-OFF state shown in FIG. 3 is repeated, it is judged to be the normal state, thus completing this flow to the end.

When the short-circuit or the disconnection is judged in Step 112, a fail countermeasure is taken in Step 114, and the driver is warned of this in Step 116, thus completing this flow. In this case, as the fail countermeasure, as will be described hereunder, such a countermeasure can be thought of that, for example, as the change value signal, even when that signal is delivered to the engine control computer 7, the engine control computer 7 does not carry out the engine torque change control (for example, by lag angle control), whereas, the automatic transmission control computer 8 lowers the shift point to decrease the absorbed energy value in the frictionally engaging devices.

The fail countermeasure need not necessarily be limited to the above-described countermeasures. For example, when ignition timing retard values are used to perform the engine torque changes and are delivered by use of the three engine torque change value communication lines 41-43, and if any one of the lines 41-43 becomes short-circuited or disconnected, the ignition timing retard values associated with the ON-OFF operations of the three communications lines 41-43 are predetermined in accordance with the prearrangement shown in FIG. 4 (which is a chart illustrating the types of ignition timing retard values transmitted by the lines 41-43). As a result, incomplete engine torque controls associated with the disconnection lines 41-43 can be carried out with the prearrangement shown in FIG. 4.

In this case, on the automatic transmission side, the shift point may be lowered as much as the engine torque change control is incomplete. As a result, the degree of lowering of the power performance due to the lowered shift point can be decreased.

When the result of a trouble judgment on the engine control computer side is reported to the automatic transmission side or vice versa, a communication line should be provided separately of others. With this arrangement, the fail countermeasures can be taken (which will be described hereunder).

Additionally, in this embodiment, the trouble detection is performed in the cranking state of the engine, however, the trouble detection may be made at any time only if the trouble detection is made within "the predetermined time duration within the non-performing region" of the original control.

FIGS. 5 to 10 show the second embodiment of the present invention.

Figure 5:
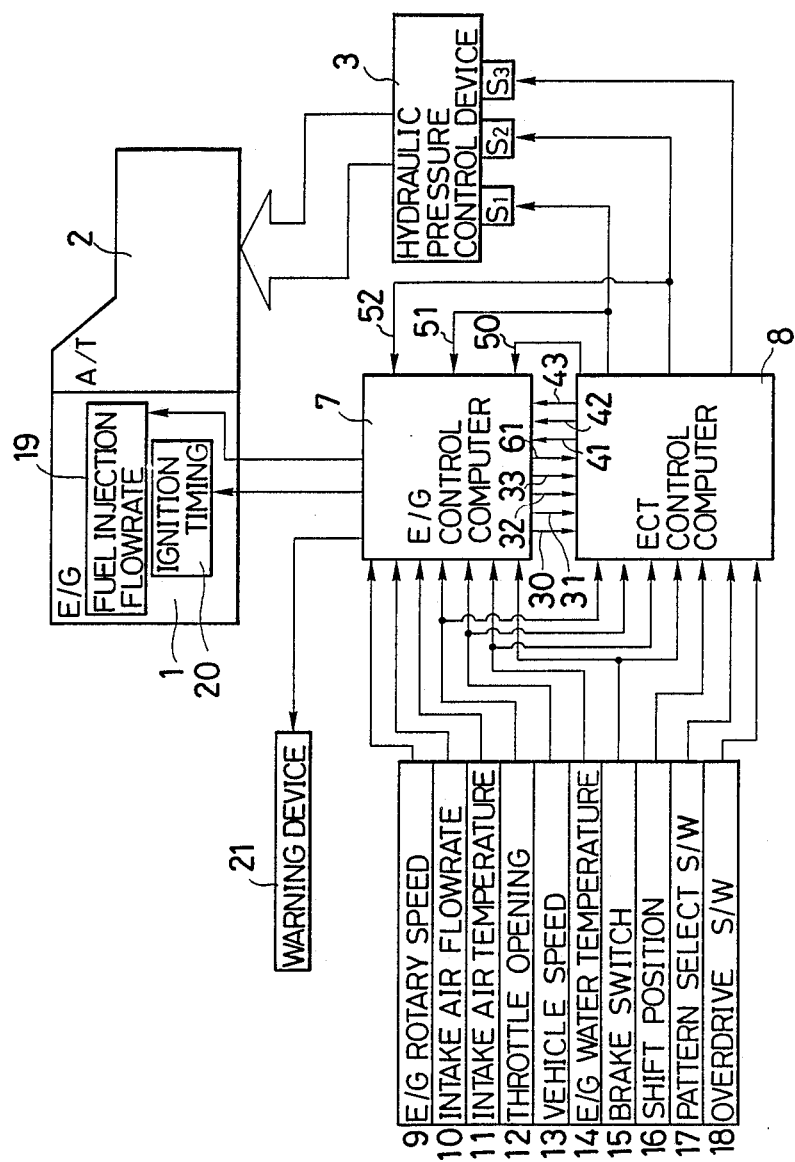
FIG. 5 is a general block diagram showing the trouble detecting device in the system for integrally controlling an engine and an automatic transmission, to which is applied a second embodiment of the present invention.

FIG. 5 shows the basic arrangement of the device. Since this basic arrangement of the device is substantially the same as the arrangement of the first embodiment (FIG. 1), the same reference numerals are used to designate the same or similar parts. The second embodiment differs from the first embodiment in respect of that:

(a) A redundancy communication line 50 is added to solenoid signal communication lines 51 and 52.

(b) A redundancy communication line 30 is added to throttle opening communication lines 31-33.

(c) A torque control stop signal is outputted from the engine control computer 7 through a communication line 61, so that the automatic transmission control computer 8 can judge that the engine 1 does not or cannot carry out the torque control.

Figure 6:
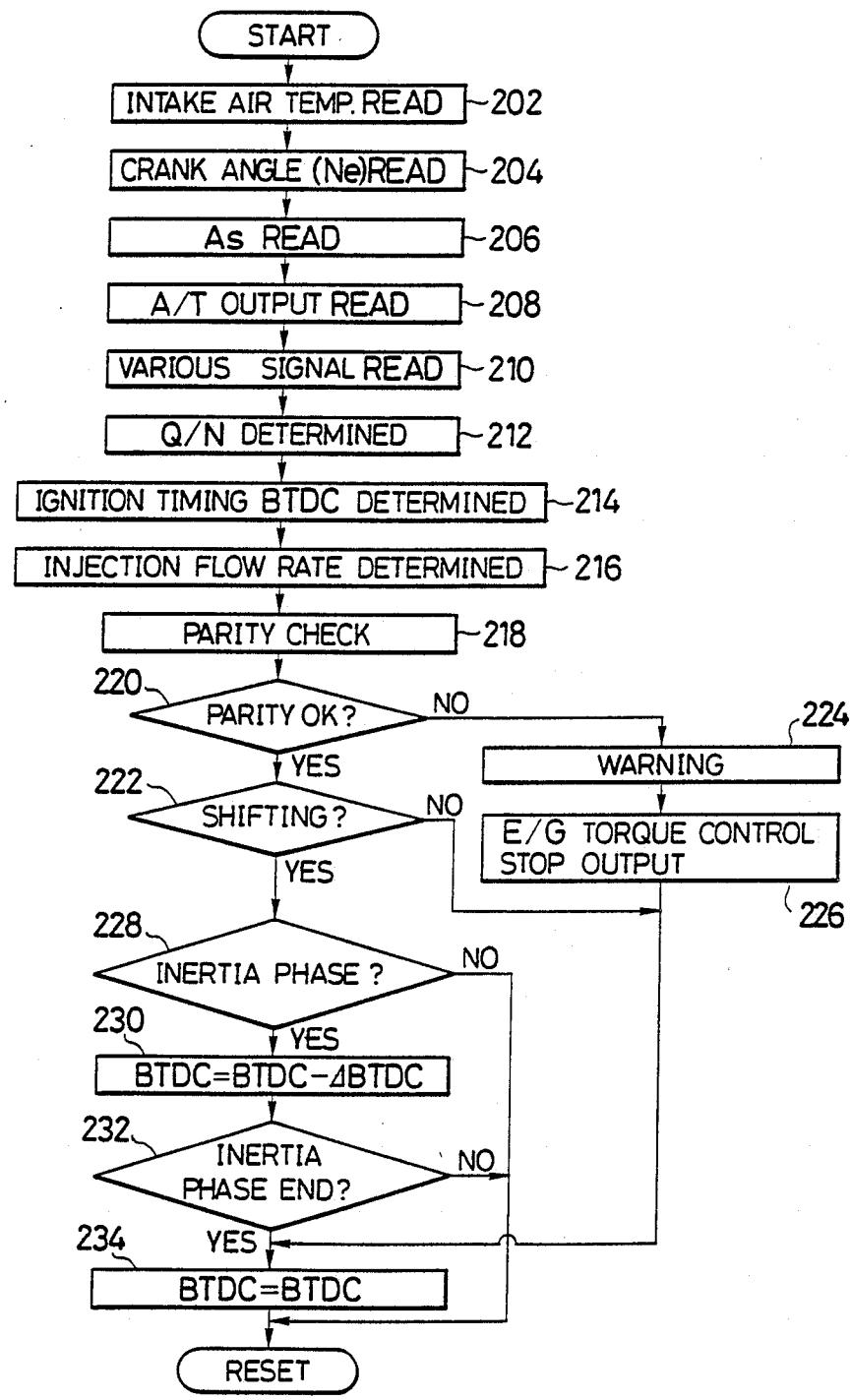
FIG. 6 is a flow chart showing a control routine carried out by an engine computer in the device of the above embodiment.

FIG. 6 shows the control flow of main routine in the engine control computer.

In Steps 202, 204, 206, 208, 210, an intake air flow rate Q, a crank angle (engine rotary speed) Ne, a throttle opening As, output values from the automatic transmission control computer 8 (outputs of the communication lines 51 and 52, and outputs of redundancy communication line 50) and various signals (engine cooling water temperature, intake air temperature and so on) are read in.

Therefore, in Step 212, an intake air flow rate per turn of the engine Q/N is calculated. Furthermore, in Step 214, an ignition timing BTDC is determined, and, in Step 216, a fuel injection flow rate and injection timings are determined by a well known method.

Subsequently, in Step 218, the parity check is carried out. FIG. 7 shows an example of the parity check. Now, if the signals inputted into the engine control computer 7 are the solenoid outputs S1 and S2, then the automatic transmission control computer 8 further outputs parity information P to the redundancy communication line 50. The value of this parity information P is outputted such that the sum of the number of ON signals. i.e. the sum of the number of "1" signals including the solenoid outputs S1 and S2 becomes an even number. For example, in the first speed, S1 is "1" and S2 is "0", whereby the parity information P is made to be "1", so that the sum of "1" signals can become an even number. When reading the solenoid outputs, the engine control computer 7 checks the solenoid outputs. By checking the solenoid outputs, the engine control computer 7 checks whether the communications of signals are reliable or not. As apparent from FIG. 7, this checking may have any one of various contents in accordance with original ON-OFF operations of the solenoid outputs. For example, if S1 is "1", S2 is "0" and P is "0", then (a) and (b) as shown below are thought of.

(a) Originally, the gear stage is second (the solenoid outputs from the automatic transmission control computer: S1 is 1 and S2 is 1), however, the communication line of the electromagnetic valve S2 is disconnectd.

(b) Originally, the gear stage is first (the solenoid outputs: S1 is 1 and S2 is 0) and S1 and S2 are normally communicated, however, the redundancy communication line 50 for communicating the parity information P is disconnected.

When is is judged that the result of the parity check is normal in Step 220, the routine proceeds to Step 222, where a shift judgment is carried out normally, and, in Step 228 and henceforth, the engine torque down control during shifting is carried out. More specifically, in Step 228, the start of an inertia phase (inertia phase is a period of time, during which rotary members of the automatic transmission perform changes in rotary speed for a shifting) is detected, and, at the stage where the inertia phase is started, the ignition timing BTDC is retarded by a predetermined value of dBTDC (Step 230). As a result, the engine torque is decreased. Thereafter, in Step 232, the completion of the inertia phase is detected, and, thereafter, the ignition timing BTDC is restored (Step 234). As a result, the engine torque is restored. Decrease of engine torque during shifting as described above makes it possible to maintain the shift characteristics satisfactorily and improve the durability of the frictionally engaging devices in the automatic transmission.

On the other hand, when some abnormality is detected as a result of the parity check is Step 220, the routine proceds to Step 224, where a warning of the abnormality is outputted via line 61, an engine torque control stop signal is outputted into the automatic transmission control computer 8 in Step 226, and thereafter, the routine proceeds to Step 234.

Figure 8:
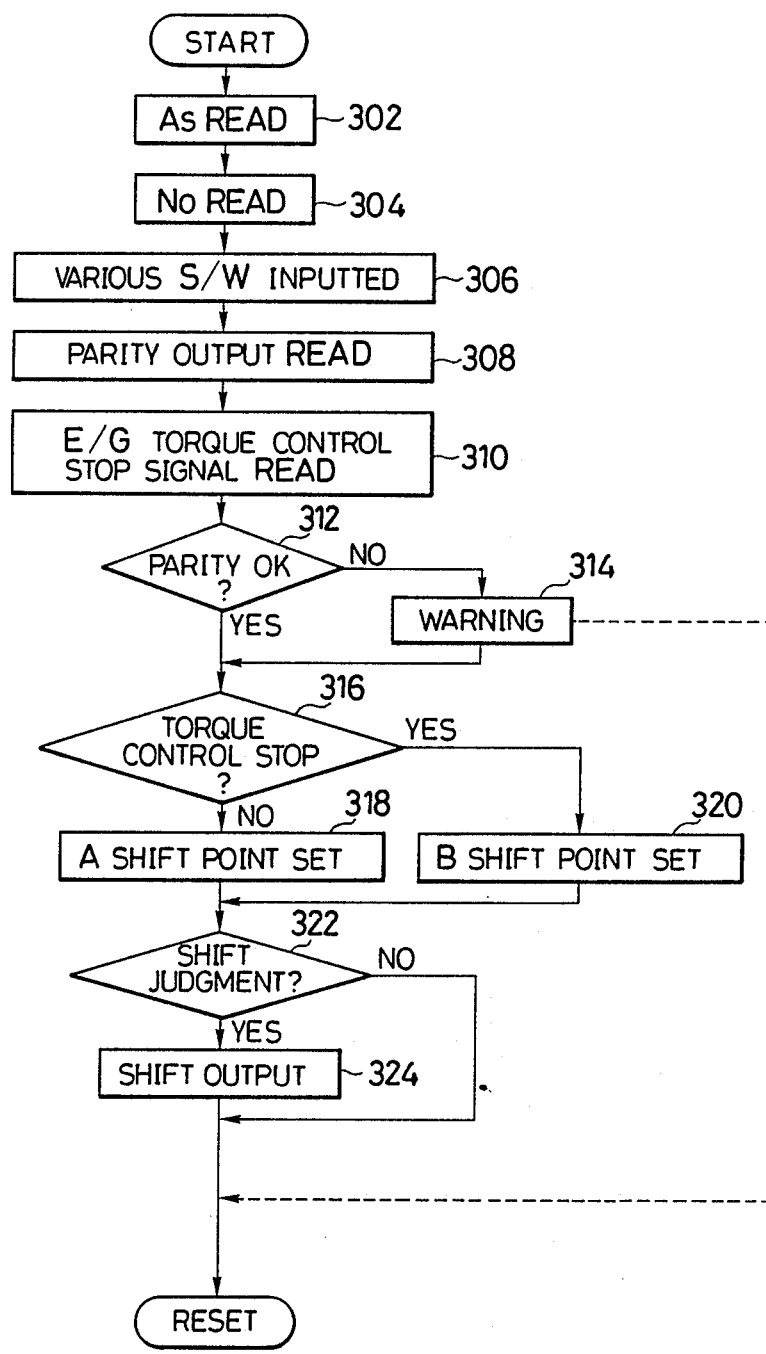
FIG. 8 is a flow chart showing a control routine carried out by an automatic transmission control computer.

FIG. 8 shows the control flow of the automatic transmission control computer 8.

First, in Steps 302, 304, 306, 308, and 310 the throttle opening As, an output shaft rotary speed (vehicle speed) of the automatic transmission NO, various input signals (from overdrive switch, pattern select switch and the like), a parity output and the engine torque control stop signal are read in.

The throttle opening As is transmitted from the engine control computer 7 through the communication lines 31-33 and the redundancy communication line 30 as described above. The various trouble detections as shown in FIG. 9 for example can be carried out in the parity check in Step 312.

Figure 10A:
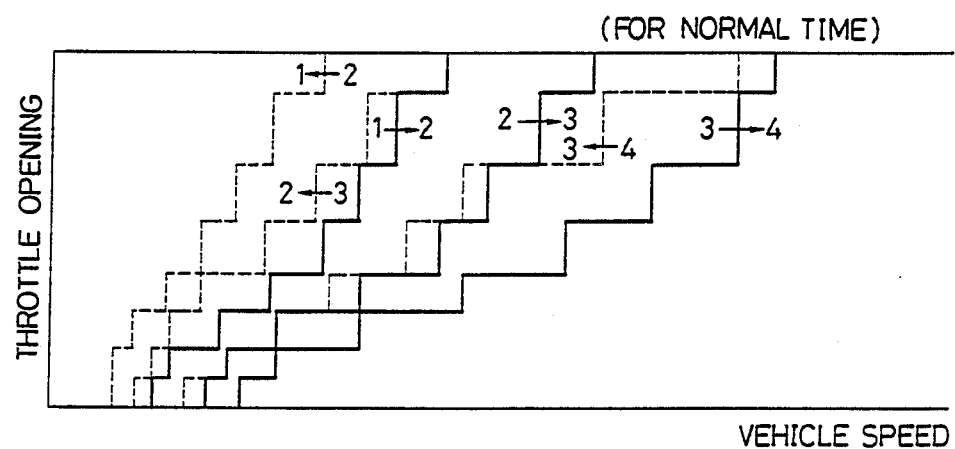
FIGS. 10(A) and 10(B) are charts showing the modifications of a shift map.
Figure 10B:
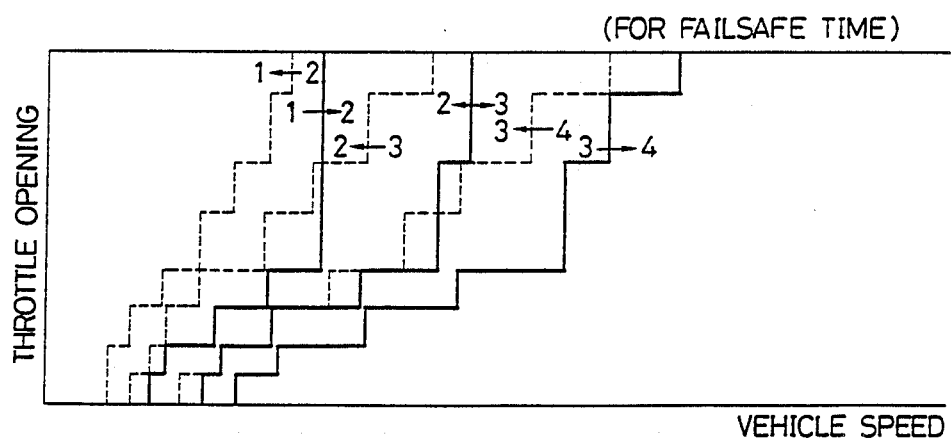

When the normality is judged as the result of the parity check in Step 312, the routine directly proceeds to Step 316, and, when the abnormality is judged as the result of the parity check in Step 312, a warning is outputted in Step 314, and thereafter, the routine proceeds to Step 316. In Step 316, judgment is made as to whether a torque change control stop signal (the signal in Step 226) is outputted or not. When the stop signal is not outputted, a normal shift point is set (as illustrated in FIG. 10A which shows a preset shift map when malfunctions are not present in the communication lines). When the stop signal is outputted, a slightly lower shift point is set for securing the durability of the frictionally engaging devices (as illustrated in FIG. 10B which shows a preset shift map when malfunctions in the communication lines are detected). The shift point is made slightly low, so that absorbed energy of the frictionally engaging devices can be reduced and the durability of the frictionally engaging devices can be improved. Thereafter, in Step 322, a shift judgment is performed in accordance with the shift point thus set, and a shift output is outputted in Step 324.

Additionally, according to this second embodiment, even when some trouble is detected as the result of the parity check, the warning is outputted in Step 314, and thereafter, the shifting was carried out normally. However, since there is no reliability in a base signal for performing a shift judgment such as a throttle opening signal, the shifting itself may be prohibited and reset may be made directly as indicated by a broken line in FIG. 8. In this case, the automatic transmission control computer 8 preferably outputs a signal to ask for torque stop to the engine control computer 7. Needless to say, an engine torque control prohibition signal may be included in the subjects of the parity check.

Figure 11:
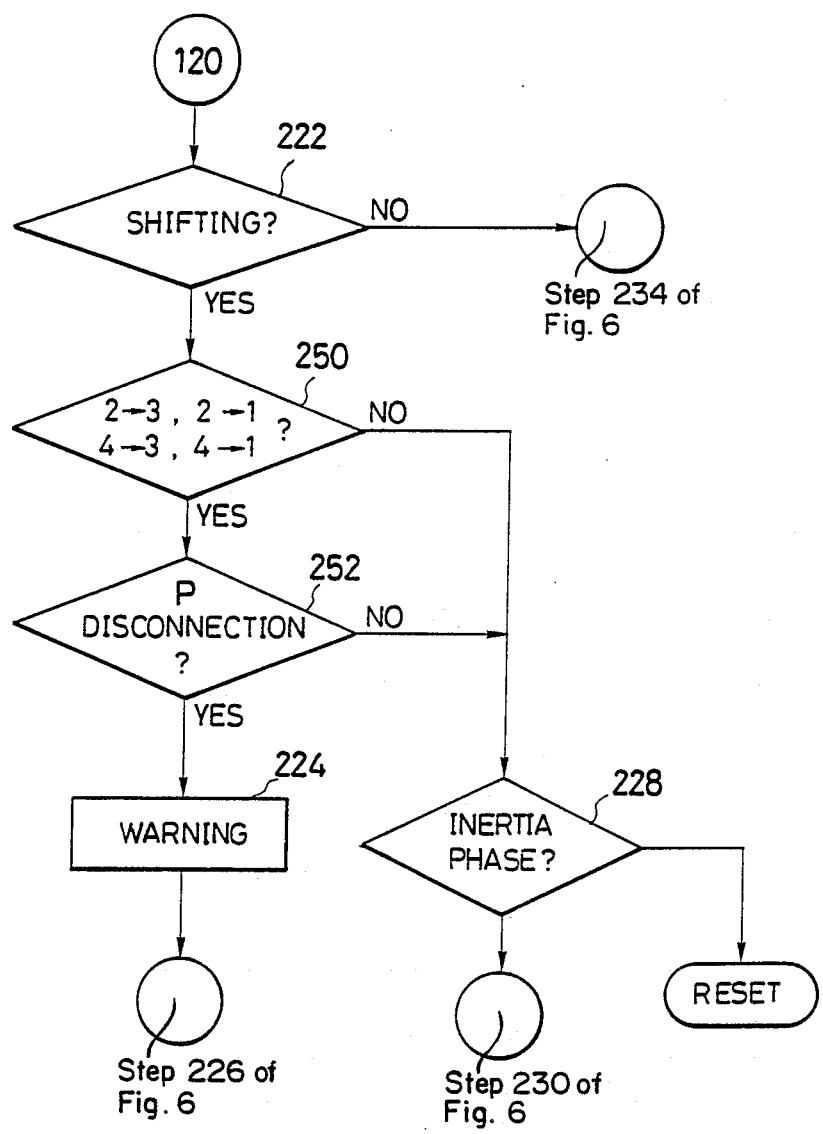
FIG. 11 is a flow chart partially showing a control routine of the engine control computer for detecting a trouble in a parity information system, to which is applied a third embodiment of the present invention.

FIG. 11 shows the third embodiment of the present invention in which an example of another flow of the engine control computer in the second embodiment is illustrated. This flow is of such an arrangement that, after a shift judgement is carried out in Step 222 in FIG. 6, Steps 250 and 252 are provided, so that, during a shifting in which the parity information P is changed from 0 to 1, judgment of disconnection of the parity information itself can be made depending on whether the parity information P is changed from 0 to 1 or not. In particular, the types of shifting which disconnection of the parity information is possible (see FIG. 7) are checked in Step 250 (for example upshifting from second to third, downshifting from second to first, fourth to third, or fourth to first). If the determination is negative, the routine proceeds to the inertia phase of Step 228 in FIG. 6 and then to Step 230 from which step the flow chart of FIG. 6 continues. If the determination is positive, Step 252 determines whether the parity information is disconnected (by judging whether the parity information is 0 or 1), and if so the warning of Step 224 is outputted before the engine torque control stop output of Step 226 in accordance with the flow chart of FIG. 6. Otherwise, if the parity information is not disconnected, the routine proceeds to Step 228 and continues through Step 230 in accordance with the flow chart of FIG. 6. It is noted that if the shifting determination in Step 222 is negative, the routine continues to Step 234 in accordance with FIG. 6. The other respects are similar to those in the flow chart shown in FIG. 6.

Figure 12:
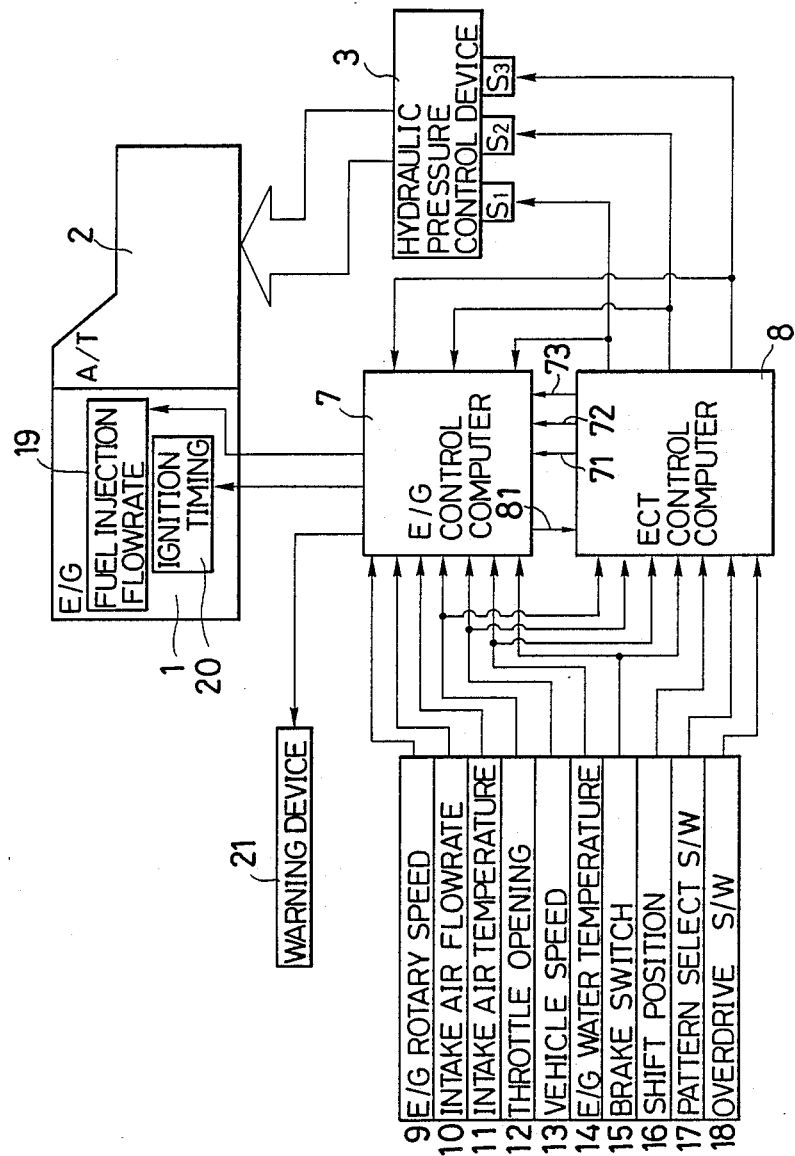
FIG. 12 is a general block diagram showing the trouble detecting device in the system for integrally controlling an engine and an automatic transmission, to which is applied a fourth embodiment of the present invention.

FIGS. 12 and 13 show the fourth embodiment of the present invention, FIG. 12 illustrating the basic arrangement of the device. Since this basic arrangement of the device is substantially the same as that of the first embodiment (FIG. 1), the same reference numerals are used to designate the same or similar parts. The respects differences the first embodiment are:

(a) The throttle opening signal is directly inputted into the engine control computer 7 and the automatic transmission control computer 8;

(b) Communication lines 71-73 for transmitting the torque change value have additional functions for transmitting the torque change timing.

(c) A communication line 81 is provided for reporting the state of the lag angle control (engine torque control) from the engine control computer 7 to the automatic transmission control computer 8.

The communication line 81 is turned into the state of repeating the ON-OFF operation at high speed (permission signal), to thereby report that the engine control computer 7 is in the state where the lag angle control can be carried out to the automatic transmission control computer 8. Furthermore, the communication line 81 is turned into the OFF state (prohibition signal), to thereby report that the engine control computer 7 is in the state where the lag angle control is to be prohibited. Further, the communication line 81 is turned to the ON state (performing signal), to thereby report that the lag angle control is under way at present.

Figure 13B:
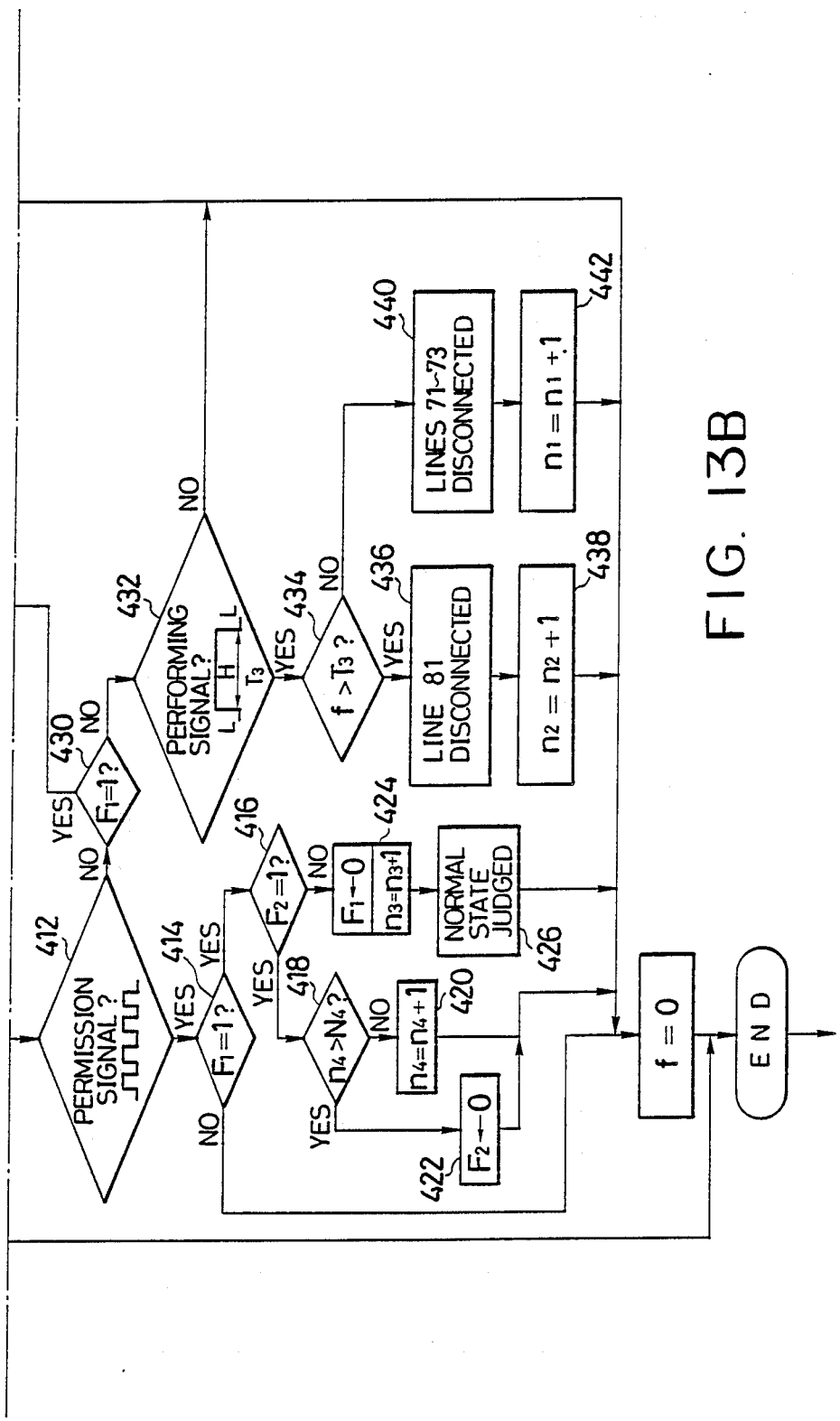

FIGS. 13A and 13B show the control flow for judging troubles in the communication lines 71-73 and 81 in the device of the above embodiment.

To make the understanding easier, the gist and effects of this control flow will be described first, before the description of the respective Steps. A. When the communication lines 71-73 and 81 are all normal:

Basically, the trouble detection is carried out in a region where the engine control computer 7 does not receive the engine torque change information (non-performing region). OFF level signals are delivered from the automatic transmission control computer 8 to the engine control computer 7 through all of the three communication lines 71-73 of the engine torque change value for a predetermined time duration T2. When the engine control computer 7 detects that all the signals are OFF level, the engine control computer 7 judges that all of the communication lines 71-73 are not disconnected (non-trouble), and delivers a high speed ON-OFF repeating signal which is identical with the permission signal to the automatic transmission control computer 8 through the communication line 81 for a predetermined time duration T3. The automatic transmission control computer 8 receives this high speed ON-OFF repeating signal for the predetermined time duration T3, to thereby be able to recognize that all of the communication lines 71-73 and 81 are normal. Additionally, this predetermined time duration T3 is set to a time duration longer than a time duration which would practically be required for the torque change control. B. When even one of the communiction lines 71-73 is disconnected:

Even if the automatic transmission control computer 8 delivers all the OFF level signals through the three communication lines 71-73, the engine control computer 7 recognizes that any one of these three communication lines, which is disconnected, is an ON level signal. When receiving this ON level signal, the engine control computer 7 delivers the ON level signal which is identical with the engine torque change performing signal through the communication line 81 for the predetermined time duration T3, whereby the automatic transmission control computer 7 can recognize that any one of the communication lines 71-73 is in trouble. C. When the communication line 81 is disconnected:

Whatever information is delivered by the engine control computer 7, when the communication line 81 is disconnected, then the automatic transmission control computer 8 recognizes it as the ON level signal which is identical with the performing signal. Then, the automatic transmission control computer 8 searches whether or not this ON level signal is delivered for the predetermined time duration T3 or more, to thereby recognize it by discriminating whether it is a signal for reporting the disconnection of any one of the communication lines 71-73 or it is a signal for reporting the disconnection of the communication line 81 itself.

When the disconnections of the communication lines 71-73 are detected N1 times cumulatively as described above, the communication lines 71-73 are judged to be in a trouble state (i.e., malfunctions due to disconnection or short circuit). Furthermore, when the disconnections of the communication line 81 are detected N2 times cumulatively, the communication line 81 is judged to be in a trouble state. Even after the communication lines 71-73 or 81 is judged to be in trouble state, the trouble detections are continued. When non-trouble (i.e., proper operation) detections are detected N4 times cumulatively, the normal state is judged again.

As described above, in the case where the trouble state, the normal state, the trouble state, . . . are repeated, when the times of passing from the trouble state judgments to the normal state judgments reach N3 times cumulatively and the trouble state is judged, the trouble state is judged finally or verified, and thereafter, the trouble judgment is stopped.

Additionally, when the trouble state is judged, the trouble detection is carried out even in the performing region of the engine torque change control. In this case, when the permission signal (the high speed ON-OFF repeating signal) is delivered from the engine control computer 7, it is regarded that all of the communication lines 71-73 and 81 are restored to the non-trouble state. Then, non-trouble count is started. When a signal other than the permission signal is delivered, the trouble state judgment is maintained as it is.

The control flow shown in FIG. 13 will hereunder be described specifically.

In Step 402, judgment is made as to whether the present time is included in a non-performing region of the engine torque change or not. As this non-performing region, a time duration during which the engine is in the cranking state, i.e. a predetermined time duration immediately afer the turn-ON of the ignition switch can be adopted, for example. Or, a time duration, during which the throttle opening is less than a predetermined value can be adopted as the non-performing region, since the engine torque change control during shifting is not carried out when the throttle opening is less than the predetermined value. When it is judged to be the performing region, the routine proceeds to Step 404, where judgment is made as to whether the present situation is judged to be the trouble state or not, i.e. flag F1 is 1 or not. When it is judged to be the performing region and the normal state, this flow is completed.

When it is judged to be the non-performing region of the engine torque control change in Step 402, the routine proceeds to Step 406. Here, when it is judged that the disconnection judgment number of times n1 of the communication lines 71-73 is larger than a predetermined number N1 (n1<N1) or the disconnection judgment number of times n2 is larger than a predetermined number N2 (n2<N2), the trouble state is judged in Step 408, and flag F1 is set at 1 in Step 410. At this time, to continue the trouble detection regardless of this trouble state, n1=n2=0 is adopted.

When n1≦N1 and n2≦N2, the disconnection judgments are performed after lapse of a predetermined time duration T1 in Step 407. This predetermined time duration T1 is intended for allowing the battery to be stabilized after entering the non-performing region and more detailed steps will be described hereunder with reference to FIG. 14.

The disconnection judgment is made such that OFF level signals are delivered from the automatic transmission control computer 8 to the engine control computer 7 for T2 sec through the communiation lines 71-73 and judgment is made as to whether the engine control computer 7 receives the OFF level signals through all of the communication lines 71-73 or not. When all the signals thus received are the OFF level signals, the permission signal repeating ON-OFF at high speed is delivered from the engine control computer 7 to the automatic transmission control computer 8 for T3 sec through the communication line 81. On the other hand, when even one ON level signal is received, an ON level signal (performing signal) is delivered for T3 sec through the communication line 81. The automatic transmission control computer 8 judges whether the signal or any other signal, and, when it is the permission signal, in Step 414, judgment is made as to whether the then flag F is 0 (the normal state) or 1 (the trouble state). When flag F1 is 0, the flow is completed as it is. When flag F1 is 1, judgment is made as to whether flag F2 (disconnection judgment flag) up to the preceding time has been 0 (the normal state) or 1 (the trouble state) (Step 416). When the result of the judgment is 1, count is continued up to n4>N4, and, when it becomes n4>N4, F2 is set at 0 (Step 422). This series of Steps are intended so that when a permission signal, i.e. a signal indicating non-trouble comes regardless of the judgment of the trouble state up to the preceding time, at a stage where this permission signal is counted N4 times in Step 418, the flag F2 is set at 0 in Step 422. As a result, flag F1 is set at 0 in Step 424 through Step 416, and the normal state can be judged in Step 426.

Additionally, in Step 424, flag F1 is set at 0, and the number of times of passing through this Step 424, i.e. the number of times n3 of being converted from judgment of the trouble state into judgment of the normal state is counted. The counted number n3 is compared with a predetermined number N3 in Step 428, and, when the converted number n3 becomes larger than the predetermined number N3, thereafter, the trouble judgment is stopped, thus maintaining the judgment of the trouble state in Step 408 as the final judgment.

On the other hand, when the automatic transmission control computer 8 receives a signal other than the permission signal through the communication line 81, "NO" is judged in Step 412. In this case, first, judgment is made as to whether flag F1 is 1 or not in Step 430. In other words, judgment is made as to whether the present situation is judged as the trouble state or the normal state. When the present situation is judged to be the trouble state, the judgment of the trouble state is maintained as it is. When the present situation is judged to be the normal state, the routine proceeds to Step 432, where the content of the signal delivered through the communication line 81 is judged. The signals delivered through the communication line 81 in the non-performing region include a prohibition signal (OFF level repeating signal) for transmitting that the engine control computer 7 should prohibit the engine torque change as described above, in addition to the permission signal and the performing signal for reporting the trouble. Since the aforesaid signal is judged not to be the permission signal in Step 412, in this Step 432, judgment is made whether the aforesaid signal is the performing signal (ON level signal) for reporting the trouble or the torque change prohibition signal (OFF level signal). When the aforesaid signal is judged to be the performing signal for reporting the trouble, judgment is made as to whether a time duration for maintaining the ON level is larger than the predetermined time duration T3 or not. As described above, it can be judged that, when the ON level time duration is longer than the predetermined time duration T3, the communication line 81 itself is disconnected, so that, after the judgements are made, the number of the disconnection judgment n2 is counted (Steps 436 and 438). On the other hand, when it is judged that the ON level time duration is equal to the predetermined time duration T3, the communication lines 71–73 are judged to be disconnected, so that, after the judgements are made, the number of the disconnection judgment n1 is counted (Steps 440 and 442). These count numbers n1 and n2 are compared with the predetermined values N1 and N2 in Step 406, and when it is judged that either one of n1 and n2 is larger than the predetermined values N1 and N2, the trouble judgment is given in Step 408.

The function of this control flow is the same as that which has been described in detail. This control flow is advantageous in that disconnections of the communication lines 71–73 for transmitting the engine torque change values and the communication line 81 for transmitting the state of lag angle control can be judged separately of one another, so that judgment can be made as to which communication line is disconnected by diagnosis and repair can be quickly performed. Furthermore, since the judgments are constantly performed in the non-performing region, such a disadvantage can be avoided that, when disconnection occurs, an inappropriate engine torque change is continued with no jugement being made, and the durability of the frictionally engaging devices can be improved accordingly.

Figure 14:
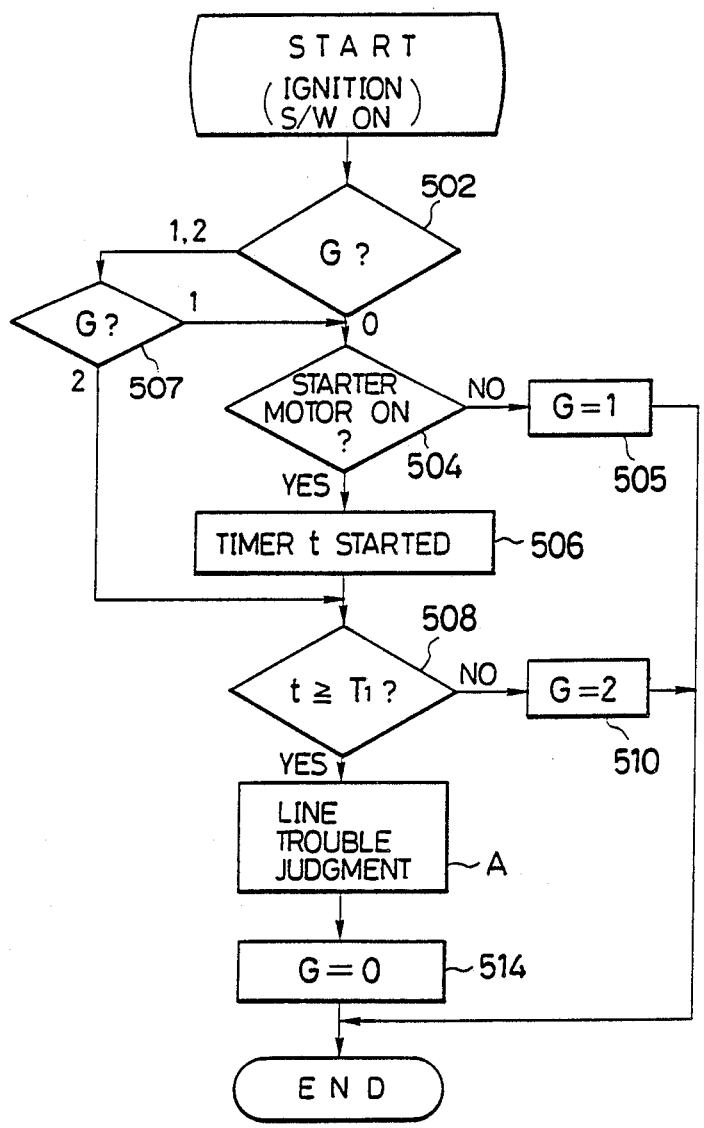
FIG. 14 is a flow chart showing a control routine allowing the stability of voltage between the battery terminals.

FIG. 14 shows the procedure corresponding to Step 407 in more detail. This Step 407 is a step for allowing the battery terminals to become stable, and, more specifically, Step 407 is performed in accordance with the control flow shown in FIG. 14.

This control flow is started simultaneously with turn-ON of an ignition switch. First, the value of flag G is judged in Step 502. This flag G, when set at 1, indicates that a starter motor is not ON yet, and, when set at 2, shows that the predetermined time duration T1 has not elapsed after starter motor is turned ON. Since flag G is set at 0 initially, the routine proceeds to Step 504.

In Step 504, judgment is made as to whether the starter motor has been turned ON or not. Until the starter motor is turned ON, flag G is set at 1 in Step 505, and the routine returns to Step 504 again through Steps 502 and 507. At the time when the starter motor is turned ON, timer t is started. In Step 508, judgment is made as to whether this timer t has elapsed the predetermined time duration T1 or not. Until the timer t elapses the predetermined time duration T1, flag G is set at 2 in Step 510, and the routine returns to Step 508 through Steps 502 and 507. This predetermined time duration T1 is set to such a time duration covering that the ignition switch is turned ON, the starter motor is turned ON, and thereafter, the voltage between the battery terminals becomes stable.

Immediately after this predetermined time duration T1 has elapsed, the routine proceeds to Step A, where the above-described trouble judgments of the communication lines are performed. Thereafter, flag G is reset at 0, thus completing this flow.

This control flow presupposes that the voltage between the battery terminals is normally equal to or higher than a predetermined value. In view of that, immediately after the starter motor is turned ON, the voltage between the battery terminals becomes highly instable instantaneously, it is intended that, after allowing this instable period of time to elapse, i.e. after the voltage between the battery terminals restores the predetermined value or thereabove, the trouble judgments of the communication lines are performed. As a result, prior to the start of driving of the vehicle, the trouble judgments can be performed with no battery voltage sensor being used, without interfering with the signals for the original control and without fail.

Figure 15:
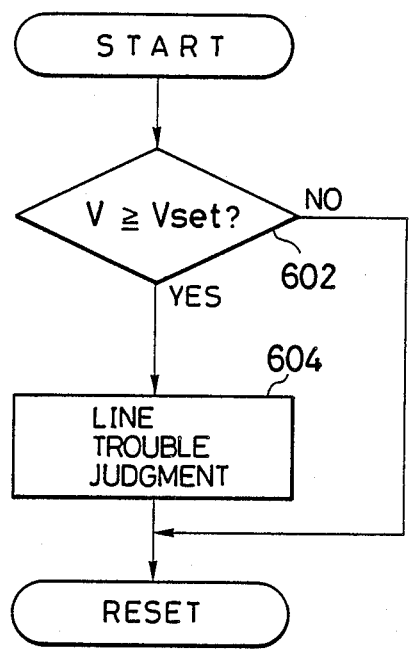
FIG. 15 is a flow chart showing a control routine for checking the stability of voltage between the battery terminals.

Additionally, in order to determine whether the voltage V between the battery terminals is equal to or higher than a predetermined value VS or not, it is more accurate that the voltage V is directly detected by means of a sensor and compared with the predetermined value VS. In this case, as shown in FIG. 15 for example, judgment is made as to whether the voltage V between the battery terminals is equal to or higher than the predetermined value VS or not in Step 602, and, only when the voltage V is equal to or higher than the predetermined value VS, the trouble judgment of the communication lines is performed (Step 604). With this arrangement, if the voltage V is in the stabilized state, the trouble judgment of the communication lines can be always performed without waiting for the predetermined time duration. Furthermore, when the trouble detection is performed by use of the redundancy code as in the second embodiment, troubles in the communication lines can be detected any time when the voltage between the battery terminals is stabilized.

FIGS. 16 through 21 show the fifth embodiment of the present invention.

The basic arrangement is similar to one shown in the fourth embodiment (Refer to FIG. 12).

Figure 16:
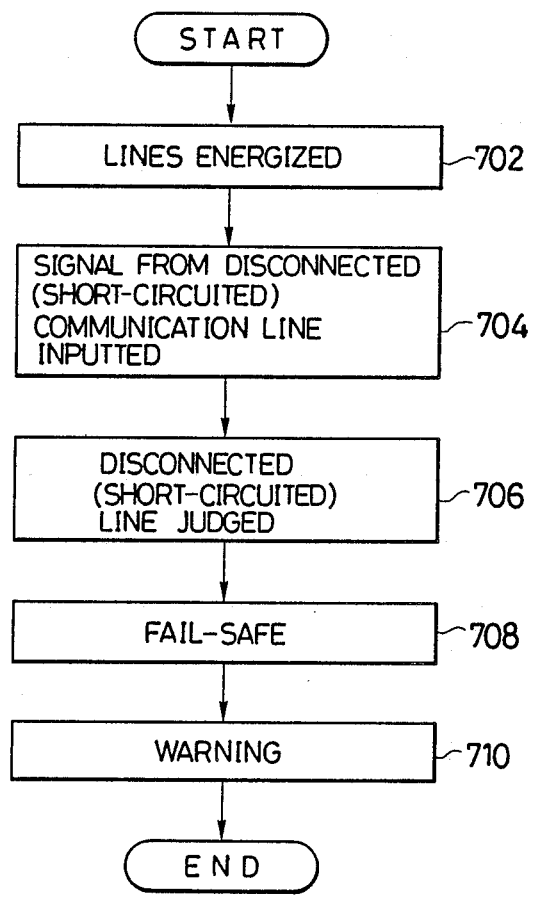
FIG. 16 is a flow chart showing a control routine for carrying out the trouble detection, judgment and fail-safe in the system for integrally controlling an engine and an automatic transmission, to which is applied a fifth embodiment of the present invention.

FIG. 16 shows the control flow in the fifth embodiment. This flow starts in the non-performing region of the original control, i.e. immediately after the ignition switch is turned ON for example.

Figures 17, 18:
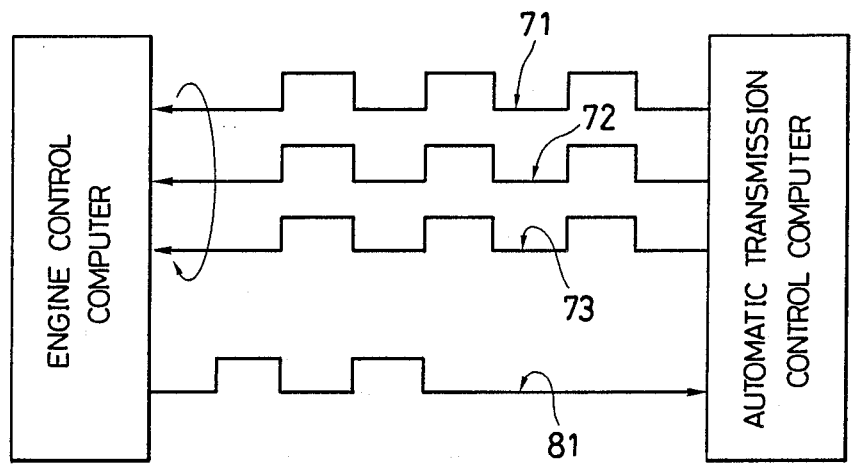
FIG. 17 is a chart showing examples of signals for detecting troubles and a signal for informing of a communication line in trouble.
FIG. 18 is a chart showing the relationship between the states of short-circuits or disconnections of the communication lines and the pulse numbers.

First, in Step 702, the preset ON-OFF repeating signal shown in FIG. 17 is delivered in the communication lines 71–73 for transmitting the lag angle value for a predetermined time duration. At this time, for example when the engine control computer 7 continuously receives ON signal or OFF signal, the short-circuit or the disconnection can be judged. Furthermore, judgment can be made as to which communication line is short-circuited or disconnected out of the plurality of communication lines 71–73. It should be natural that, during this time, even if the signal shown in FIG. 17 is inputted into the engine control computer 7 through this communication line, this signal is not interpreted as the signal of engine torque change control. The engine control computer 7 delivers the result of this trouble judgment to the automatic transmission control computer 8 through the communication line 81. As a method of delivering this signal, it is conceived to change the pulse number delivered to the automatic transmission control computer 8 in accordance with the type of the disconnected communication line as shown in FIG. 17 for example. FIG. 18 shows examples of associations of the types of communication lines with the pulse numbers. In the case of FIG. 17, the pulse number is two, so that it is indicated that the communication line 73 is disconnected or short-circuited as viewed from FIG. 18. If the pulse number delivered from the engine control computer 7 is four, the communication line 71 is short-circuited or disconnected as viewed from FIG. 18, and similarly, if the pulse number is six, the communication lines 71 and 73 are short-circuited or disconnected. Additionally, when the pulse number is zero, it is indicated that this communication line 81 itself is disconnected or short-circuited.

When the above-described signal is inputted through the communication line 81 in Step 704, in Step 706, this pulse number is counted, to thereby judge which communication line is short-circuited or disconnected. Thereafter, in Step 708, a failsafe method associated with this is performed.

FIGS. 19 is similar to FIG. 4 and through 21 show the failsafe method. FIG. 19 shows the relationship (prearrangement) of the communication line energization and deenergization with the lag angle values when all of the the communication lines 71–73 are normal. FIG. 20 shows the relationship (prearrangement) of the energization and deenergization of the normal communication lines 71, 72 with the lag angle values, when the communication line 73 is short-circuited or disconnected. Further, FIG. 21 shows the relationship (prearrangement) of the energization and deenergization of the normal communication line 71 with the lag angle values when the communication lines 72 and 73 are short-circuited or disconnected. Both of the engine control computer 7 and the automatic transmission control computer 8 perform the logic changes in association with this prearrangement. Additionally, when all of the communication lines 71–73 are short-circuited or disconnected, the engine torque change control cannot be carried out. Accordingly, it is desirable to take such countermeasures that, even if any signal is inputted into the engine control computer, the engine control computer does not carry out the engine torque change control, and the automatic transmission control computer lowers the shift point so as to secure the durability of the frictionally engaging devices in the automatic transmission. Furthermore, when the communication line 81 for reporting is disconnected or short-circuited, the above-described countermeasure are also preferably taken. With aforesaid countermeasures taken, even if any one of the communication lines 71–73 falls into trouble, the original engine torque change control can be maintained to the maximum by use of the remaining normal communication lines.

In Step 710, a warning of the trouble is given to the driver. As a result, the driver can recognize the trouble quickly so as to take the suitable countermeasures.

Additionally, settling the prearrangement of the communications at the time of a failure and the method of changing the prearrangement in the present invention need not necessarily be limited to those shown in the fifth embodiment.

Furthermore, in the preceding embodiment, there have been shown the examples wherein the present invention is applied to the system for integrally controlling the automatic tansmission and the engine, said system having the object of carrying out the engine torque change control during shifting, however, the present invention does not limit the type of the integral control by the automatic transmission and the engine.

What is claimed is:

1. A trouble-detecting device in a system for integrally controlling an automatic transmission and an engine, comprising:
   means for controlling said engine;
   means formed separately of said engine control means for controlling said automatic transmission;
   communication lines for connecting said engine control means and said automatic transmission control means to each other;
   means for determining predetermined time durations in a non-performing region of control using said communication lines, wherein said predetermined time durations in the non-performing region includes a predetermined time duration from turn-ON of an ignition switch of said engine;
   means for repetitively outputting ON-OFF signals through said communication lines at least once within said predetermined time durations; and
   means for detecting a trouble state in said communication lines by sensing said repetitive output.

2. A trouble-detecting device as set forth in claim 1 further comprising, means for outputting a warning when the trouble state is detected.

3. A trouble-detecting device in a system for integrally controlling an automatic transmission and an engine, comprising:
   means for controlling said engine;
   means formed separately of said engine control means for controlling said automatic transmission;
   communication lines for connecting said engine control means and said automatic transmission control means to each other;
   means for determining predetermined time durations in a non-performing region of control using said communication lines;
   means for repetitively outputting ON-OFF signals through said communication lines at least once within said predetermined time durations; predetermined
   means for detecting a trouble state in said communication lines by sensing said repetitive output; and
   means for detecting whether a throttle opening is less than a predetermined value, wherein said predetermined time durations in the non-performing region includes a time duration during which said throttle opening is less than the predetermined value.

4. A trouble-detecting device as set forth in claim 3, further comprising, means for changing engine torque during shifting, wherein the engine torque control information is transmitted through said communication lines.

5. A trouble-detecting device in a system for integrally controlling an automatic transmission and an engine, comprising:
   means for controlling said engine;
   means formed separately of said engine control means for controlling said automatic transmission;
   communication lines for connecting said engine control means and said automatic transmission control means to each other;
   means for determining predetermined time durations in a non-performing region of control using said communication lines;
   means for repetitively outputting ON-OFF signals through said communication lines at least once within said predetermined time durations;
   means for detecting a trouble state in said communication lines by sensing said repetitive output; and
   means for detecting whether a voltage between battery terminals is low, wherein the detection of the trouble state is stopped when the voltage is low.

6. A trouble-detecting device as set forth in claim 5 wherein said means for detecting whether the voltage between said battery terminals is low includes means for detecting whether a predetermined time duration has elapsed after a starter motor of said engine is turned ON.

7. A trouble-judging device in a system for integrally controlling an automatic transmission and an engine, comprising:
means for controlling said engine;
means formed separately of said engine control means for controlling said automatic transmission;
communication lines for connecting said engine control means and said automatic transmission control means to each other;
trouble detecting means for repetitively sensing operation of said communication lines and detecting a malfunction in said communication lines to determine whether the communication lines are in a trouble state when a malfunction is detected and in a normal state when said operation is detected;
means for detecting whether the trouble state detected by said trouble detecting means is repeated;
means for detecting whether the number of repetitions of the trouble state is greater than a predetermined number; and
means for verifying that the communication lines are in the trouble state when said number of repetitions is greater than a predetermined number.

8. A trouble-detecting device as set forth in claim 7 further comprising, means for changing engine torque during shifting, wherein the engine torque control information is transmitted through said communication lines.

9. A trouble-detecting device in a system for integrally controlling an automatic transmission and an engine, comprising:
means for controlling said engine;
means formed separately of said engine control means, for controlling said automatic transmission;
communication lines for connecting said engine control means and said automatic transmission control means to each other, and for transmitting control information therebetween;
parity check means for detecting a trouble state in said communication lines by comparing its own parity information with said control information;
means for detecting when the parity information should be changed due to a change in said control information; and
means for checking whether said parity check means is in a trouble state when the parity information is changed.

10. A trouble-detecting device as set forth in claim 9, wherein one of said communication lines is the communication line for transmitting shift output information from said automatic transmission control means, and said parity check means checks for a trouble state in said one communication line when said shift output information is produced.

11. A trouble-detecting device as set forth in claim 9 further comprising, means for outputting a warning when the trouble state is detected.

12. A trouble-detecting device as set forth in claim 9 further comprising, means for detecting whether a voltage between battery terminals is low, wherein the detection of the trouble state is stopped when said voltage is low.

13. A trouble-detecting device as set forth in claim 12 wherein said means for detecting whether the voltage between the battery terminals is low includes means for detecting whether a predetermined time duration has elapsed after a starter motor of said engine is turned ON.

14. A trouble-detecting device as set forth in claim 9 further comprising, means for changing engine torque during shifting, wherein the engine torque control information is transmitted through said communication lines.

15. A trouble-judging device in a system for integrally controlling an automatic transmission and an engine, comprising:
means for controlling said engine;
means formed separately of said engine control means, for controlling said automatic transmission;
communication lines for connecting said engine control means and said automatic transmission control means to each other;
trouble detecting means for repetitively detecting whether a malfunction exists in said communication lines;
means for detecting whether said malfunction detected by said trouble detecting means has occurred a plurality of times; and
means for verifying a trouble state when said detections of said malfunction have occurred a plurality of times.

16. A trouble-judging device as set forth in claim 15 wherein said means for detecting whether the malfunction detections have occurred a plurality of times includes means for detecting whether the malfunction detections have continuously occurred a plurality of times.

17. A trouble-judging device as set forth in claim 15 wherein said means for detecting whether the malfunction detection has occurred a plurality of times includes means for detecting whether the malfunction detections have cumulatively occurred a plurality of times.

18. A trouble-judging device as set forth in claim 15 further comprising means for outputting a warning when the trouble state is verified.

19. A trouble-detecting device as set forth in claim 15 further comprising, means for changing engine torque during shifting, wherein the engine torque control information is transmitted through said communication lines.

20. A trouble-judging device as set forth in claim 19, further comprising means for outputting a warning when the trouble state is verified.

21. A trouble-judging device in a system for integrally controlling an automatic transmission and an engine, comprising:
means for controlling said engine;
means formed separately of said engine control means for controlling said automatic transmission;
communication lines for connecting said engine control means and said automatic transmission control means to each other;
trouble detecting means for repetitively sensing operation of said communication lines and detecting a malfunction in said communication lines;
means for judging whether said trouble detecting means has detected said operation a plurality of times after a malfunction is determined; and
means for judging a normal state when said operation is detected a plurality of times.

22. A trouble-detecting device as set forth in claim 21 further comprising, means for changing engine torque during shifting, wherein the engine torque control information is transmitted through said communication lines.

23. A trouble-judging device as set forth in claim 21 further comprising means for outputting a warning when the normal state is not judged.

24. A failsafe device in a system for integrally controlling an automatic transmission and an engine, comprising:
means for controlling said engine;
means formed separately of said engine control means, for controlling said automatic transmission;
communication lines for connecting said engine control means and said automatic transmission control means to each other for communication in a predetermined arrangement;
means for detecting whether at least one communication line out of said communication lines is malfunctioning;
means for changing the predetermined arrangement used for communication to a changed arrangement of the remaining communication lines in accordance with the type of malfunction detected in the communication line; and
means for maintaining communication by use of at least one of the remaining normal functioning communication lines in accordance with said changed arrangement.

25. A trouble-detecting device as set forth in claim 24 further comprising, means for changing engine torque during shifting, wherein the engine torque control information is transmitted through said communication lines.

26. A failsafe device as set forth in claim 24, further comprising, means for outputting a warning when the malfunction is detected in any one of the communication lines.

27. A failsafe device as set forth in claim 24, further comprising, means for individually identifying the malfunctioning communication line by delivering pulses through the communication lines, the number of said pulses being preset in accordance with said type of malfunction.

* * * * *